(12) United States Patent
Lutoslawski (10) Patent No.: US 6,799,705 B1
(45) Date of Patent: Oct. 5, 2004

(54) CUP HOLDER CLOSURE AND RELEASE APPARATUS

(76) Inventor: Jarek Lutoslawski, 300 East Avenue, Toronto, Ontario (CA), M1C 2W4

( * ) Notice: Subject to any disclaimer, the term of this patent is extended or adjusted under 35 U.S.C. 154(b) by 137 days.

(21) Appl. No.: 09/703,578

(22) Filed: Nov. 1, 2000

Related U.S. Application Data
(60) Provisional application No. 60/162,972, filed on Nov. 1, 1999.

(51) Int. Cl.[7] ................................................ B60R 7/00
(52) U.S. Cl. ....................... 224/483; 224/282; 224/926; 296/37.12; 292/341.17; 292/DIG. 4
(58) Field of Search ................................. 224/282, 540, 224/542, 483, 553, 554, 926; 296/37.12; 248/311.2; 292/341.17, DIG. 4

(56) References Cited

U.S. PATENT DOCUMENTS

| | | | | |
|---|---|---|---|---|
| 2,565,873 A | * | 8/1951 | Meyer | 200/523 |
| 2,741,930 A | * | 4/1956 | Montooth et al. | 292/111 |
| 3,156,493 A | * | 11/1964 | Griffiths | 292/164 |
| 3,674,329 A | * | 7/1972 | Schill | 292/DIG. 4 |
| 4,641,747 A | * | 2/1987 | Mestdagh et al. | 206/308.1 |
| 4,657,292 A | * | 4/1987 | Bruck | 292/80 |
| 4,660,871 A | * | 4/1987 | Arakawa et al. | 292/198 |
| 4,669,764 A | * | 6/1987 | Bruck | 292/341.17 |
| 4,925,072 A | * | 5/1990 | Masler et al. | 224/280 |
| 5,004,276 A | * | 4/1991 | Hanley | 292/126 |
| 5,090,751 A | * | 2/1992 | Kobayashi | 292/210 |
| 5,248,183 A | * | 9/1993 | Gignac et al. | 248/311.2 |
| 5,498,039 A | * | 3/1996 | Bivens | 292/145 |
| 5,680,974 A | * | 10/1997 | Vander Sluis | 224/278 |
| 5,820,094 A | * | 10/1998 | Tanaka | 224/282 |
| 5,845,954 A | * | 12/1998 | DePue | 16/82 |
| 6,056,333 A | * | 5/2000 | Wach | 292/137 |
| 6,062,623 A | * | 5/2000 | Lemmen | 224/282 |
| 6,085,953 A | * | 7/2000 | Bober et al. | 224/282 |

* cited by examiner

*Primary Examiner*—Nathan J. Newhouse
(74) *Attorney, Agent, or Firm*—Reising, Ethington, Barnes, Kisselle, P.C.

(57) ABSTRACT

A swing-down cup holder closure and release apparatus for releasably locking a cup tray portion of a swing-down cup-holder in a stowed position includes a latch that is supported either on the cup tray or a supporting structure such as an automotive seat or instrument panel. A latch receiver is supported on the other of the cup tray and the supporting structure. The latch and latch receiver are supported in positions on the cup tray and supporting structure, respectively, such that the latch engages the latch receiver when the cup tray is moved to the stowed position. The latch disengages and releases the cup tray from the stowed position in response to a predetermined amount of pressure applied inwardly to the cup tray. This allows an automotive vehicle passenger compartment occupant to release the cup holder with a single pressing motion and without having to directly manipulate the latch.

25 Claims, 7 Drawing Sheets

CUP HOLDER CLOSURE AND RELEASE APPARATUS

This application claims priority of U.S. provisional patent application No. 60/162,972 filed Nov. 1, 1999.

TECHNICAL FIELD

This invention relates generally to a closure and release apparatus, and, more particularly to a closure and release apparatus that releasably locks a cup tray portion of a cup-holder in a stowed position.

BACKGROUND OF THE INVENTION

It is known for automobiles to include one or more cup holders of the type that include cup trays that a vehicle occupant can move between an upright stowed position to a horizontal deployed position—generally by rotating such a cup tray about a horizontal pivot. The cup tray portion of this type of cup holder generally includes a cup well shaped to receive and support a beverage container in an upright position when the tray is in the deployed position. It is also known for a cup holder of this type to include a closure and release apparatus that includes a latch supported on the cup tray and a latch receiver supported on a vehicle interior structure such as an instrument panel or trim panel. The latch and latch receiver are supported in positions on the cup tray and support bracket, respectively, so that the latch engages the latch receiver when the cup tray is moved to the stowed position. A passenger compartment occupant must then directly actuate the latch to release the cup tray from the stowed position.

"Push-push" latches for releasably locking structural elements together, where one of the elements is movably supported relative to the other element, are also well known. Push-push latches allow an operator to release one structural element from another structural element by applying and then releasing pressure on one of the structural elements and without having to directly manipulate the latch. A latch of this type, such as the one disclosed in U.S. Pat. No. 6,056,333 (issued May 2, 2000 to Wach) will typically include a guide pin supported on one of the structural elements and a labyrinth supported on the other of the structural elements. The labyrinth and guide pin are positioned on their respective structural elements such that the guide pin enters the labyrinth when the second structural element is moved to a stowed position adjacent the first structural element. The labyrinth includes a passage that directs the guide pin into engagement with a first labyrinth detent when the second structural element reaches the stowed position. The second structural element is locked in the stowed position when the guide pin is engaged in the first labyrinth detent. While the Wach patent discloses a labyrinth that is supported for transverse motion on one of the structural elements, other push-push latch systems are known to include fixed labyrinths and pivoting or laterally moveable "floating" pins. Relative transverse motion between labyrinth and pin allow a pin to move laterally within a labyrinth as the pin tracks through the labyrinth.

The mounting of the labyrinth and pin on respective structural elements requires that the pin leave the labyrinth when the structural elements are disengaged and move apart, and also allows high-impact re-engagement of the pin in the labyrinth when the structural elements are propelled or slammed together at a high rate of speed or with excessive force. This direct engagement the labyrinth and guide pin can reduce the service life of the latch. It also exposes the pin to inadvertent impacts and other stresses that might cause an exposed pin to break or plastically deform. An exposed pin can also present a homocogation problem in interior vehicle applications. In addition, mounting of the labyrinth and pin on respective structural elements also results in both the pin and labyrinth being visible to operators or occupants in interior vehicle applications. An exposed labyrinth is also more prone to contamination that can impede latch operation.

SUMMARY OF THE INVENTION

A swing-down cup holder closure and release apparatus is provided for releasably locking a cup tray portion of a swing-down cup-holder in a generally vertical stowed position, the cup tray being supported on an automotive tray support structure for motion between the stowed position and a generally horizontal deployed position. The apparatus comprises a latch configured to be supported on one of the cup tray and the tray support structure of the swing-down cup-holder and a latch receiver configured to be supported on the other of the cup tray and the tray support structure. The latch and latch receiver are supportable in positions on the cup tray and tray support structure, respectively, such that the latch engages the latch receiver when the cup tray is moved to the stowed position. The latch is configured to disengage and release the cup tray from the stowed position in response to a predetermined amount of pressure applied inwardly to the cup tray. This enables an automotive vehicle passenger compartment occupant to easily release the cup holder with a single pressing motion and without having to directly manipulate the latch.

According to another aspect of the invention, the latch includes a latch base panel supported on the tray support structure and a shuttle supported on the latch base panel. The latch base panel and shuttle are configured to cooperatively move the tooth between the engaged and retracted positions in response to successive applications of a predetermined amount of pressure to the shuttle.

According to another aspect of the invention, the latch base panel is formed with an instrument panel retainer as a single unitary piece.

According to another aspect of the invention, the shuttle is supported on the latch base panel for reciprocal linear motion between a forward position and an aft position. The shuttle includes a flexible extension that extends generally parallel to the direction of shuttle reciprocal motion and integrally connects a main body portion of the shuttle to the tooth. The shuttle also includes a crossbar that extends integrally and transversely from the flexible extension adjacent the tooth. The cross bar is supported on a ramp that extends integrally from the latch base panel. The cross bar and ramp are oriented such that shuttle movement toward the aft position causes the cross bar to ride up the ramp, bending the flexible extension upward and moving the tooth upward to the retracted position. Likewise, shuttle movement toward the forward position causes the cross bar to ride down the ramp, moving the tooth downward to the engaged position.

According to another aspect of the invention, the shuttle includes a push post that extends from a main body of the shuttle through a post slot in the latch base panel. The push post extends into a position to be engaged by the cup tray when the cup tray is in the stowed position. Inward pressure on the cup tray causes the tray to engage and move the push post forward, which moves the shuttle toward the forward position.

According to another aspect of the invention, the shuttle includes a floating guide pin supported for transverse reciprocal sliding motion in a transverse slot in the main body portion of the shuttle. The latch base panel includes a maze or labyrinth that includes walls extending integrally upward from an upper surface of the latch base panel. The labyrinth is configured to guide a lower distal end of the floating guide pin into engagement with forward and aft detents of the labyrinth. When the pin is engaged in the aft detent the pin retains the shuttle in the aft position. Likewise, when the pin is engaged in the forward detent the pin retains the shuttle in the forward position. The shuttle is biased aft to urge the pin into engagement in the respective detents.

According to another aspect of the invention, the labyrinth is configured to cause the floating guide pin to follow a circuitous path between an aft and a forward detent. When the cup tray, in the stowed position, is pushed forward, engaging the push pin and moving the shuttle forward, the floating guide pin is driven around the path to a position in the labyrinth where release of the cup tray and the aft bias of the shuttle will pull the pin aft into the forward detent. When the cup tray is pushed a second time, the floating guide pin is driven forward to a position in the labyrinth where subsequent release of the cup tray and the aft bias of the shuttle will pull the pin aft into the aft detent. Repeated pushes against the cup tray will therefore alternately engage the floating guide pin in the aft and forward detents of the labyrinth and alternate the shuttle between the aft and the forward positions.

According to another aspect of the invention a swing-down cup holder is provided that comprises a cup tray supported on an automotive tray support structure for motion between a generally vertical stowed position and a generally horizontal deployed position. A latch is supported on one of the cup tray and the tray support structure of the swing-down cup-holder and a latch receiver is supported on the other of the cup tray and the tray support structure. The latch and latch receiver are supported in positions on the cup tray and tray support structure, respectively, such that the latch engages the latch receiver when the cup tray is moved to the stowed position. The latch is configured to disengage and release the cup tray from the stowed position in response to a predetermined amount of pressure applied inwardly to the cup tray.

According to another aspect of the invention, the cup tray is configured to automatically move out of the stowed position once the latch has disengaged.

According to another aspect of the invention, the cup tray is configured to automatically move to the deployed position once the latch has disengaged.

According to another aspect of the invention, a banana track is supported on the support structure and the cup tray is supported on a banana track for rotational motion between the stowed and deployed positions.

According to another aspect of the invention, the cup tray is biased to move from the stowed position toward the deployed position. The bias may be provided by a spring operatively connected between the cup tray and the tray support structure.

According to another aspect of the invention, a damper is operatively connected between the cup tray and the tray support structure. The damper dampens biased movement of the cup tray toward the deployed position and provides smooth cup holder operation.

According to another aspect of the invention, one of the latch and the latch receiver is supported on an outer edge wall of the cup tray rather than on side walls of the cup tray to leave the side walls free of hardware that would otherwise be exposed with the cup tray in the deployed position. Hardware on the sidewalls would detract from the finished, aesthetic appearance of the cup holder when the cup tray is deployed.

According to another aspect of the invention, the latch is supported on the tray support structure rather than on the outer edge wall of the cup tray. This leaves the outer edge wall, which is a class-A surface, free of hardware that would be exposed with the cup tray out of the stowed position and would therefore detract from the aesthetic appearance of the cup holder.

According to another aspect of the invention, the cup tray includes a recess formed in the outer edge wall of the cup tray and the latch includes a tooth movable between an engaged position and a retracted position. When the tooth is in the engaged position and the cup tray is in the stowed position the tooth extends into the recess and retains the cup tray in the stowed position. In the retracted position, the tooth is clear of the recess. This leaves the cup tray free to move out of the stowed position.

According to another aspect of the invention, a closure and release apparatus is provided for releasably locking a first structural element to a second structural element movably supported relative to the first structural element. The second structural element is releasable from the first structural element by applying and then releasing pressure on the second structural element. The apparatus includes a latch base, a guide pin, and a labyrinth, each supportable on one of the first and second structural elements. The labyrinth and guide pin are positioned such that the guide pin is disposed within the labyrinth when the second structural element is disposed in a stowed position adjacent the first structural element. The labyrinth is configured to direct the guide pin into engagement with a first labyrinth detent as the second structural element is moved to the stowed position. The second structural element is locked in the stowed position when the guide pin is engaged in the first labyrinth detent. A latch shuttle is supported on the latch base for movement between first and second positions. The guide pin is supported on one of the base and the shuttle. The labyrinth is supported on the other of the base and the shuttle. The guide pin retains the shuttle in the second position when engaged in a second labyrinth detent and retains the shuttle in the first position when engaged in the first labyrinth detent. The shuttle is configured to hold the second structural element in the stowed position when the shuttle is in the first position by engaging a latch receiver disposed on whichever of the first and second structural elements the latch base is not supported on. The shuttle provides a secondary means of engaging the second structural element and allows the labyrinth and guide pin to be mounted in a location remote from an interface between the first and second structural elements. In such a remote location the labyrinth can be hidden from view and protected against contaminants that might otherwise impede latch operation. In addition, the remote location of the pin protects the pin from inadvertent impacts and other stresses that might cause an exposed pin to break or plastically deform.

According to another aspect of the invention, the shuttle includes an engagement element supported for motion between an engaged position engaging the latch receiver and a retracted position releasing the latch receiver. The engagement element bears the stresses associated with engaging and holding the second structural element in the stowed position. the engagement element may be disposed in a position remote from the detent selector to allow the labyrinth to be hidden from view and protected from contaminants.

According to another aspect of the invention, the latch receiver comprises a recess formed into an outer surface of the second structural element. In addition, the engagement element comprises a tooth positioned and configured to extend into the latch receiver recess when in the engaged position and when the second structural element is in the stowed position, and to remain clear of the recess in the retracted position leaving the second structural element free to move out of the stowed position. The latch base panel and shuttle are additionally configured to cooperatively move the tooth between the engaged and retracted positions in response to successive applications of a predetermined amount of pressure to the shuttle.

According to another aspect of the invention, the shuttle is supported on the base panel for reciprocal linear motion between a forward position and an aft position. The shuttle includes a flexible extension that extends generally parallel to the direction of shuttle reciprocal motion and integrally connects a main body portion of the shuttle to the tooth. The shuttle may also include a crossbar that extends integrally and transversely from the flexible extension adjacent the tooth. The cross bar may be slidably supported on a ramp supported on the latch base panel. The cross bar and ramp are oriented such that shuttle movement toward the aft position causes the cross bar to ride up the ramp, bending the flexible extension upward and moving the tooth upward to the retracted position and shuttle movement toward the forward position causes the cross bar to ride down the ramp, moving the tooth downward to the engaged position.

According to another aspect of the invention, the shuttle includes a push post that extends from a main body of the shuttle through a post slot in the latch base and into a position to be engaged by the second structural element when the second structural element is in the stowed position. As such, inward pressure on the second structural element will cause the second structural element to engage and move the push post forward which moves the shuttle toward the forward position.

According to another aspect of the invention, the guide pin is supported on the shuttle for transverse reciprocal sliding motion in a transverse slot in the main body portion of the shuttle. The slot mount allows the pin to move laterally while being directed through the labyrinth.

According to another aspect of the invention, the shuttle is biased aft to urge the pin into engagement in the respective detents.

BRIEF DESCRIPTION OF THE DRAWINGS

These and other features and advantages of the invention will become apparent to those skilled in the art in connection with the following detailed description and drawings, in which.

DETAILED DESCRIPTION

Figure 1:
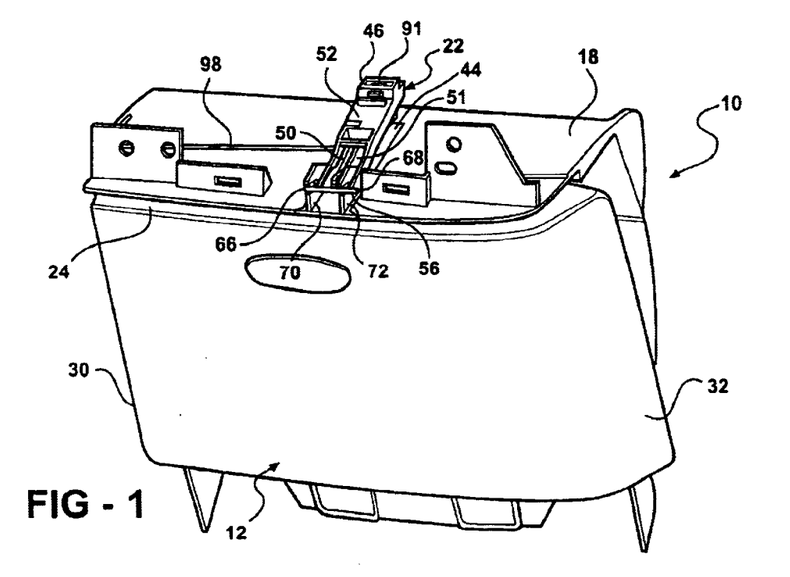
FIG. 1 is a front perspective view of a cup holder and closure and release apparatus constructed according to the invention and with a cup tray of the cup holder shown in a stowed position.
Figure 2:
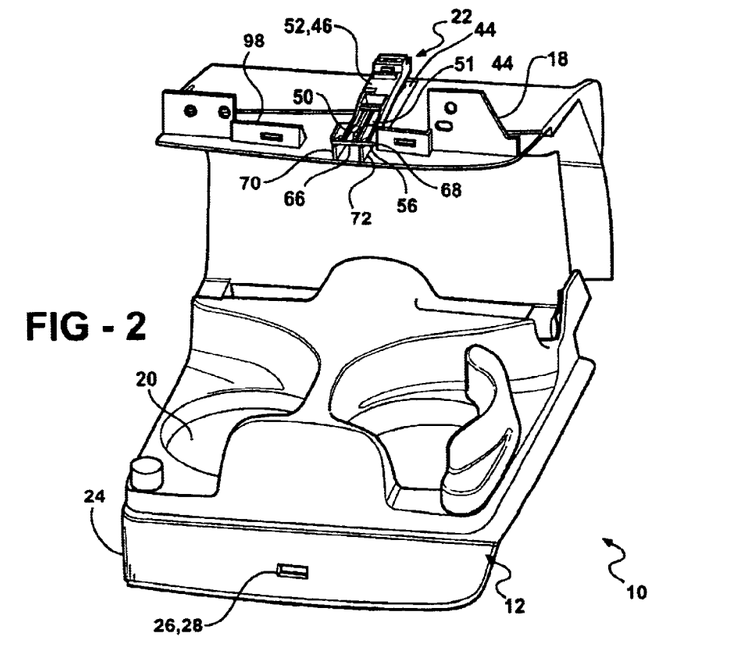
FIG. 2 is a front perspective view of the cup holder and closure and release apparatus of FIG. 1 with the cup tray of the cup holder in a deployed position.
Figure 3:
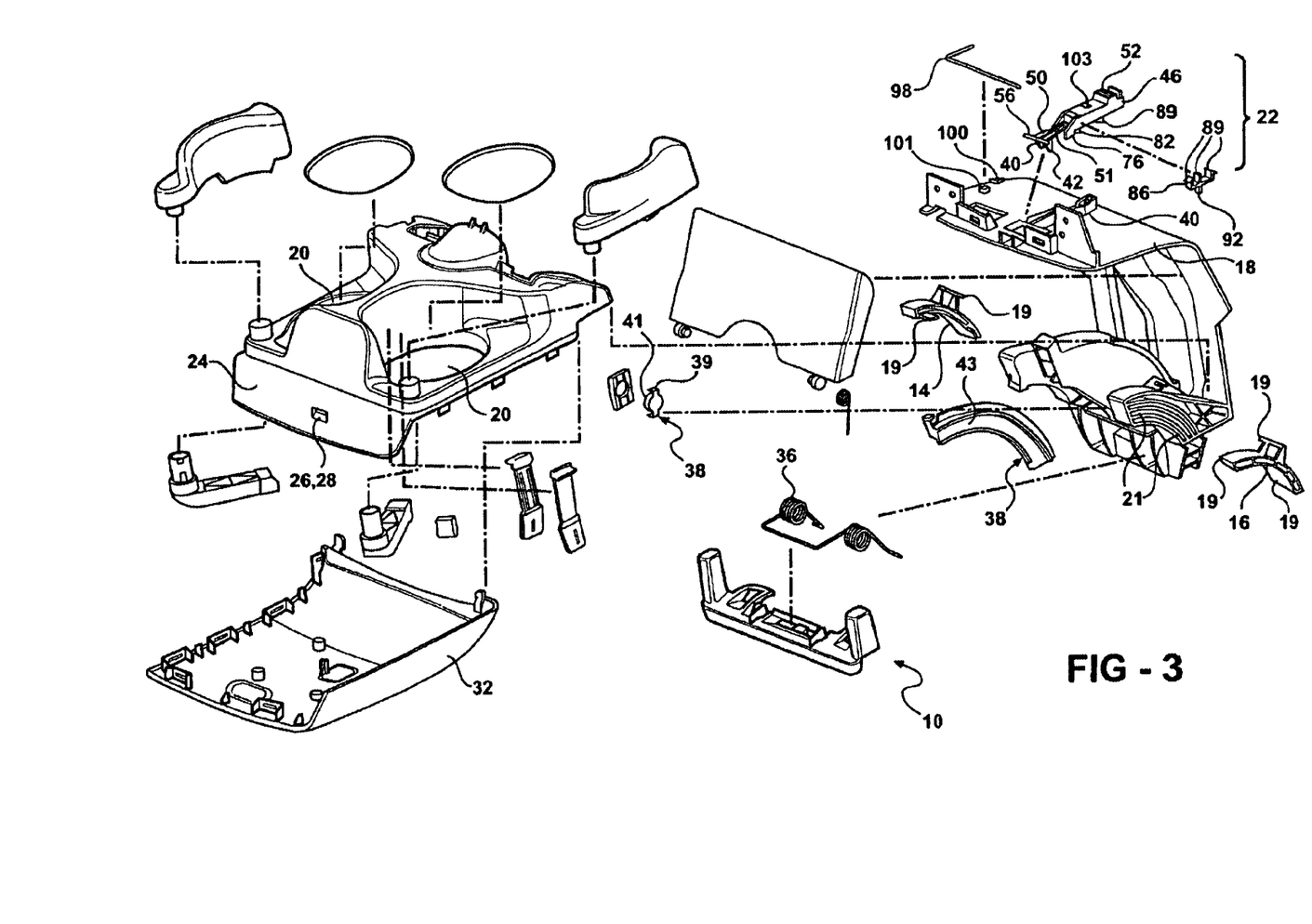
FIG. 3 is an exploded view of the cup holder and closure and release apparatus of FIG. 1.

A cup holder and closure and release apparatus for releasably locking a cup tray of the cup-holder in a stowed position is shown at 10 in FIGS. 1–3. The cup tray, shown at 12 in FIGS. 1–3, is supported on a pair of banana tracks including arcuate banana rails shown at 14 and 16 in FIGS. 3–5. The banana rails 14, 16 are supported on the tray support bracket 18. The banana rails 14, 16 include tabs 19 that engage corresponding tab receptacles 21 formed in the tray support bracket 18. A pair of arcuate banana rail receptacles, defined by receptacle walls 15, 17, are supported on the cup tray 12 and slidably receive the respective banana rails 14, 16.

In the present embodiment, the tray support bracket 18 is an instrument panel retainer. However, in other embodiments, the tray support bracket 18 may be a separate piece that is connected to or included as part of an interior automotive structure such as a seat base or a trim panel.

The cup tray 12 is supported on the banana rails 14, 16 for rotational motion between a generally vertical stowed position shown in FIG. 1 and a generally horizontal deployed position shown in FIG. 2. The banana rails 14, 16 and rail receptacles 15, 17 guide rotational motion of the cup tray 12 between the stowed and deployed positions.

The cup tray 12 includes a pair of cup recesses 20 or wells shaped to support and hold upright two generally cylindrical beverage containers such as cups or drink bottles when the cup tray 12 is in the deployed position. The cup recesses 20 are also shaped to accommodate containers of other shapes such as rectangular prism-shaped drink boxes.

A closure and release apparatus or latch, shown at 22 in the figures, is supported on the tray support bracket 18. In the present embodiment, the tray support bracket 18 is a retainer. In other embodiments the latch 22 may be supported on the cup tray 12 or on an interior automotive structure other than the tray support bracket 18. The latch 22 is supported on the tray support bracket 18 (instrument panel retainer) rather than on an outer edge wall 24 or sidewalls 30, 32 of the cup tray 12. This leaves the outer edge wall 24 and side walls 30, 32 of the cup tray 12 free of hardware and surface discontinuities that would be exposed with the cup tray 12 out of the stowed position and would therefore detract from the aesthetic appearance of the cup holder apparatus 10.

As shown in FIGS. 2 and 3, the apparatus 10 also includes a latch receiver 26 formed in the outer edge wall 24 of the cup tray 12. In embodiments where, as shown in FIGS. 2 and 3, the latch 22 is supported on the cup tray 12, the latch receiver 26 includes a recess 28 formed in the outer edge wall 24 of the cup tray support bracket 18 or an interior automotive structure.

The latch 22 and latch receiver 26 are supported in positions on the cup tray 12 and tray support bracket 18, respectively, so that the latch 22 engages the latch receiver 26 when the cup tray 12 is moved to the stowed position. The latch 22 is preferably a "touch latch 22" (otherwise known in the art as a "push-push" latch 22) configured to disengage and release the cup tray 12 and to allow the cup tray 12 to fall open, i.e., move downward from the stowed position to the deployed position in response to a predetermined amount of pressure applied inwardly to the cup tray 12. This allows an automotive vehicle passenger compartment occupant to easily release the cup holder apparatus 10 with a single pressing motion and without having to directly manipulate a latch 22.

Figure 4:
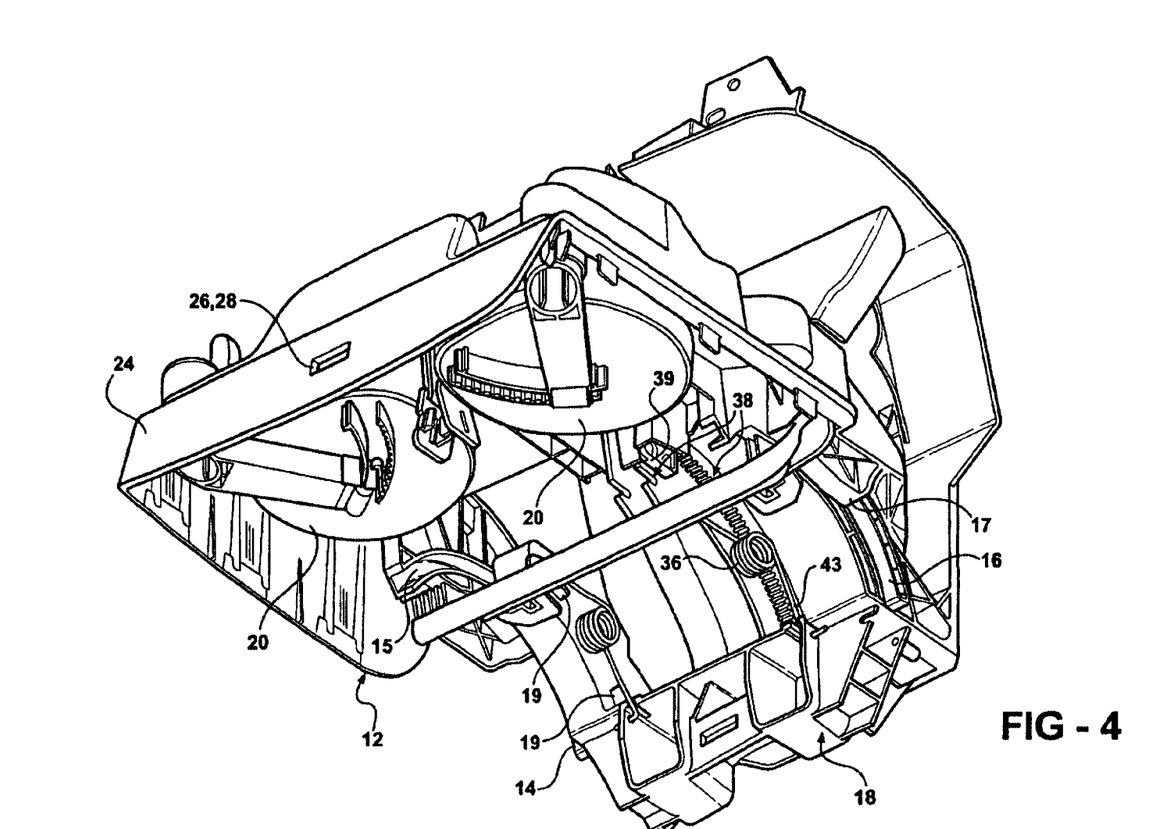
FIG. 4 is a bottom front right perspective view of the cup holder and closure and release apparatus of FIG. 1 shown assembled but with a lower shell of the cup tray portion of the cup holder removed.
Figure 5:
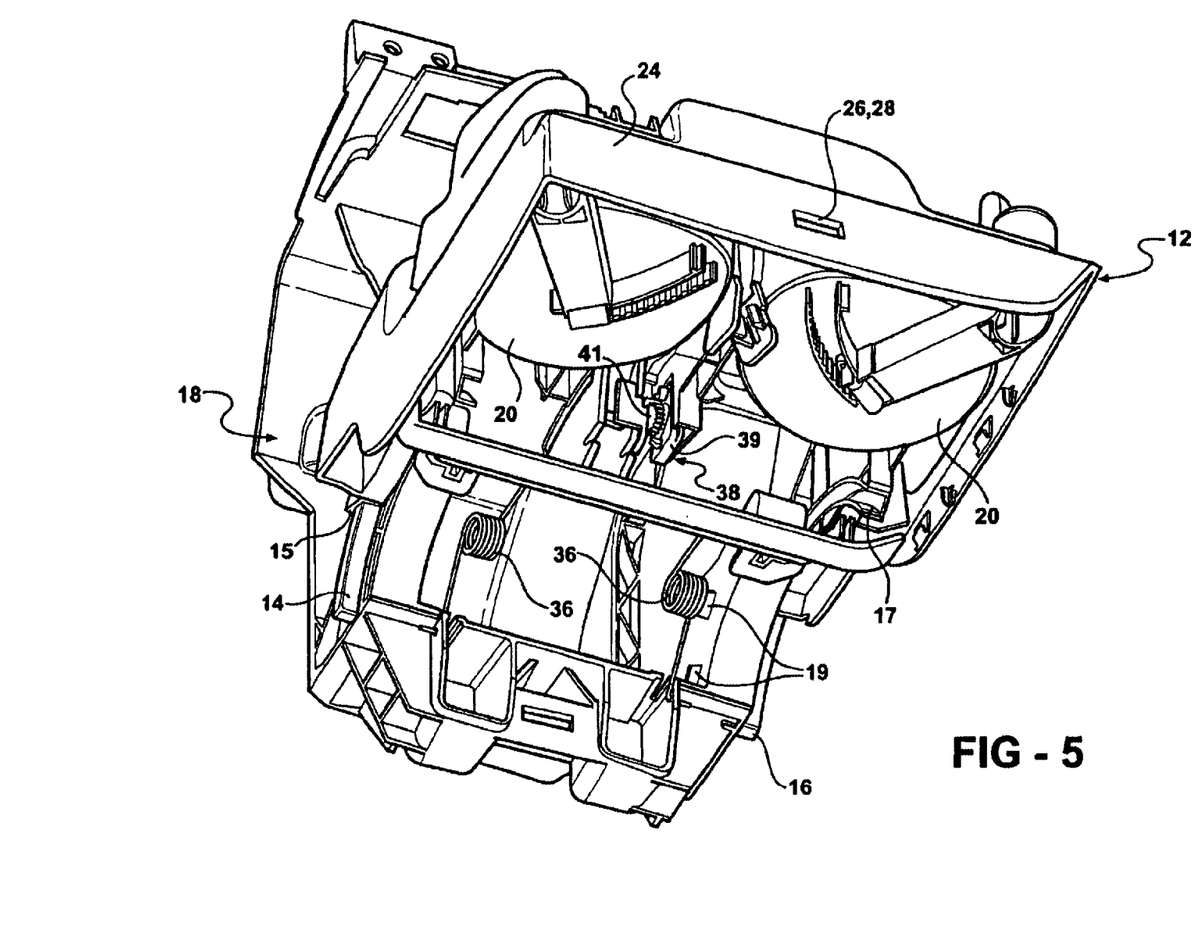
FIG. 5 is a bottom front left perspective view of the cup holder and closure and release apparatus of FIG. 4.

A spring, shown at 36 in FIGS. 3–5 is operatively connected between the cup tray 12 and the tray support bracket 18 and biases the cup tray 12 to move from the stowed position toward the deployed position. Therefore, the cup tray 12 will automatically move downward out of the stowed position to the deployed position once an occupant has caused the latch 22 to disengage. In the present embodiment the spring 36 includes to coil spring sections formed from a single spring wire. However, in other embodiments, the spring 36 may be a spiral "watch" spring, or any other suitable form of biasing device known in the art.

A tray damper, shown at 38 in FIGS. 3–5, is operatively connected between the cup tray 12 and the tray support bracket 18 and is configured to dampen cup tray rotation toward the deployed position. The damper 38 includes a viscous damper 39 of known construction and available from Illinois Tool Works Inc. (ITW). The viscous damper 39 is supported on the cup tray 12 and includes a toothed gear 41 positioned to engage an arcuate toothed rail 43 supported on the cup tray 12. The tray damper 38 smoothes and slows cup tray 12 motion when the cup tray 12 is moving to the deployed position and prevents the cup tray 12 from rebounding from the deployed position.

Figure 9:
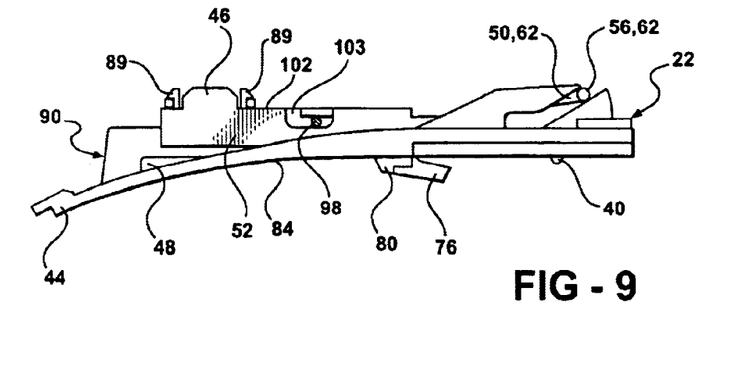
FIG. 9 is a side view of the latch of FIG. 7.
Figure 11:
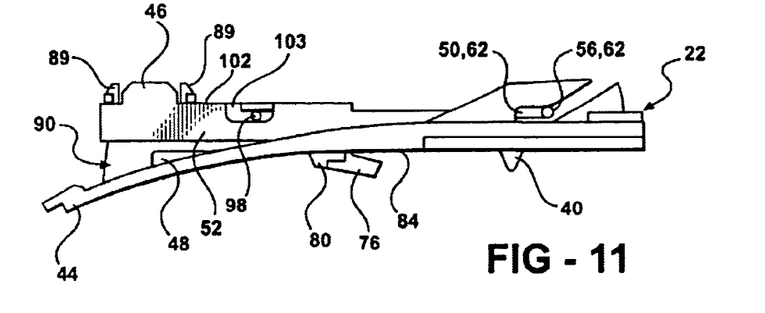
FIG. 11 is a side view of the latch of FIG. 9.

The latch 22 includes two teeth shown at 40 and 42 in FIGS. 3, 9 and 11. The teeth 40, 42 are supported for motion between an engaged position best shown in FIG. 11 and a retracted position best shown in FIG. 9. When the teeth 40, 42 are in the engaged position and the cup tray 12 is in the stowed position, the teeth 40, 42 extend downward into the recess 28 and retain the cup tray 12 in the stowed position. In the retracted position the teeth 40, 42 are disposed upward and clear of the recess 28, leaving the cup tray 12 free to move out of the stowed position.

The latch 22 includes a tray base panel 44 supported on the tray support bracket 18 and a shuttle 46 supported on a slide track 48 formed on the tray base panel 44. The tray base panel 44 may either be molded together with the instrument panel retainer as a single unitary piece or fabricated as a separate piece then fixed to the instrument panel retainer or other supporting structure. The tray base panel 44 and shuttle 46 are configured to cooperatively move the teeth 40, 42 between the engaged and retracted positions in response to successive applications of a predetermined amount of pressure to the shuttle 46 through the cup tray 12 when the cup tray 12 is in the stowed position.

Figure 6:
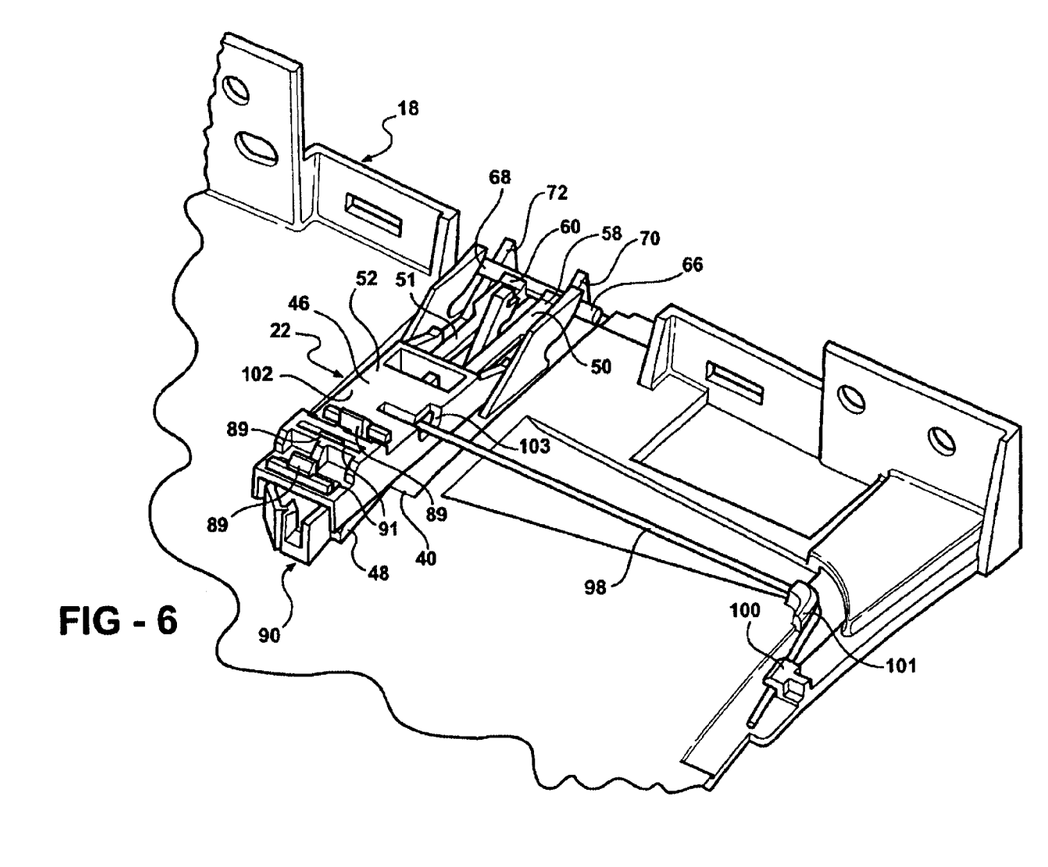
FIG. 6 is a magnified view of a latch of the cup holder and closure and release apparatus of FIG. 1.
Figure 7:
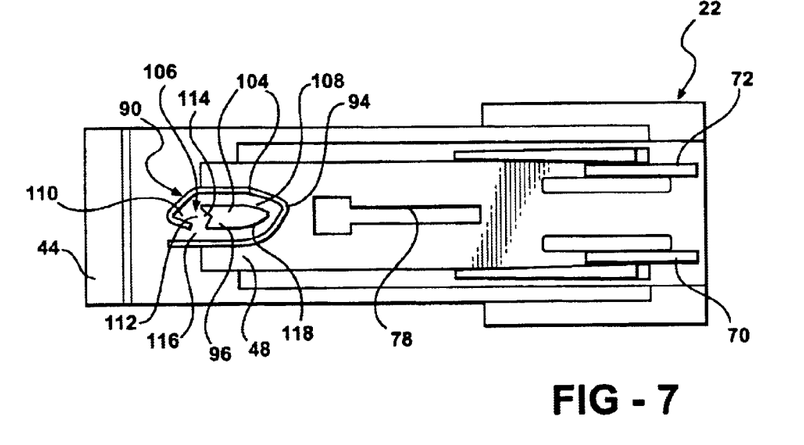
FIG. 7 is a top view of a latch base panel portion of the latch of FIG. 5.
Figure 8:
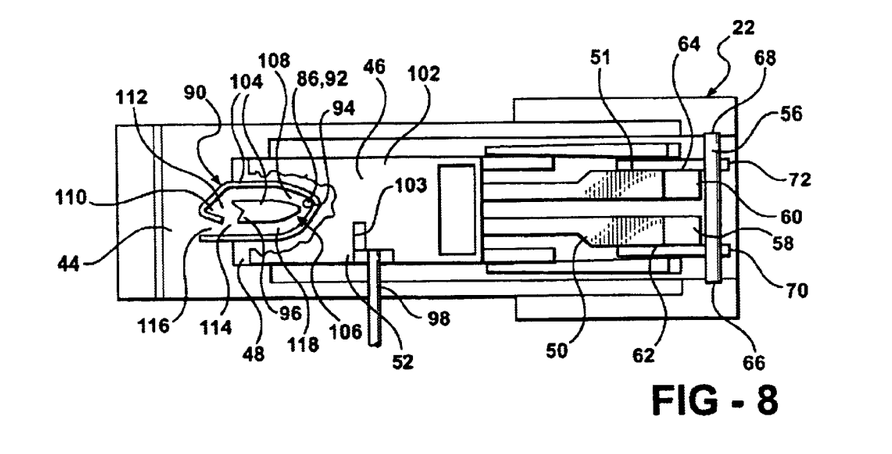
FIG. 8 is a top view of the latch of FIG. 5 with a slide portion of the latch shown disposed in a forward position and tooth portions of the slide shown in a retracted position.
Figure 10:
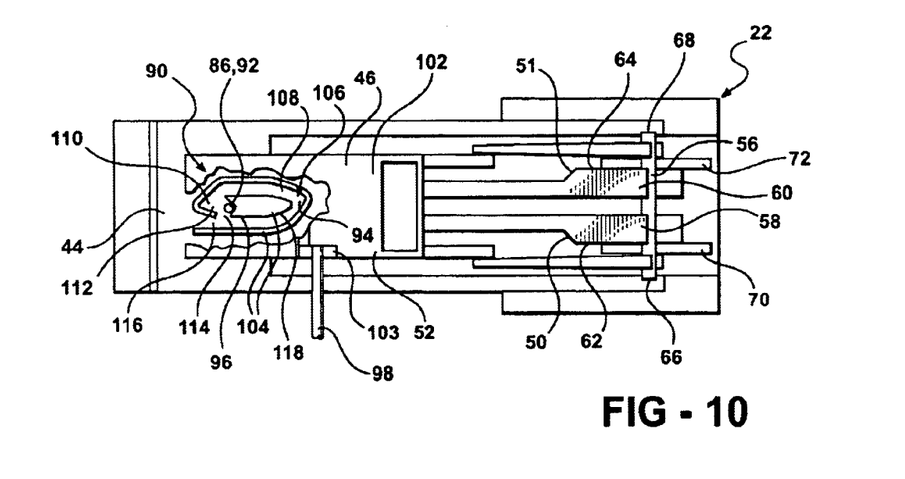
FIG. 10 is a top view of the latch of FIG. 5 with the slide shown in an aft position and the teeth shown in an extended position.

The shuttle 46 is supported on the tray base panel 44 for reciprocal linear motion between a forward position best shown in FIGS. 10 and 11 and an aft position best shown in FIGS. 6, 8 and 9. The shuttle 46 includes flexible elongated parallel extensions 50, 51 that are oriented generally parallel to the direction of shuttle 46 reciprocal motion. The extensions 50, 51 extend aft from a main body 52 of the shuttle 46 and integrally connect the main body 52 to an upper base of each of the teeth 40, 42.

The shuttle 46 also includes a crossbar 56 disposed transversely across respective distal ends 58, 60 of the integral extensions 50, 51 adjacent the teeth 40, 42. The crossbar 56 protrudes transversely beyond outer side edges 62, 64 of the extensions 50. Transversely protruding portions 66, 68 of the crossbar 56 are supported on respective ones of two parallel ramps 70, 72. The ramps 70, 72 integrally extend upward from an upper surface 74 of the tray base panel 44, bracketing the shuttle 46 extensions 50. The crossbar 56 and ramps 70, 72 are oriented such that shuttle movement toward the aft position causes the crossbar 56 to ride up the ramps 70, 72, bending the flexible extensions 50, 51 upward and moving the teeth 40, 42 upward to their retracted position. Conversely, movement of the shuttle 46 toward the forward position causes the crossbar 56 to ride down the ramps 70, 72, moving the teeth 40, 42 downward to the engaged position.

As shown in FIGS. 9 and 11, the shuttle 46 includes a push post 76 that extends downward from the main body 52 of the shuttle 46 through a post slot 78 in the tray base panel 44 and into a position to be engaged by the outer edge wall 24 of the cup tray 12 when the cup tray 12 is in the stowed position. Inward pressure on the cup tray 12 causes the outer edge wall 24 of the cup tray 12 to engage and move the push post 76 forward which moves the shuttle 46 toward its forward position. As shown in FIGS. 3, 8 and 9, the push post 76 includes a pair of integrally laterally extending flanges 80, 82 that engage a bottom surface 84 of the tray base panel 44 to help retain the shuttle 46 on the tray base panel 44 while allowing the push post 76 to slide longitudinally in the post slot 78.

The shuttle 46 includes a floating guide pin 86 supported for transverse reciprocal sliding motion in a transverse slot 88 in the main body 52 of the shuttle 46 opposite the extensions 50. Upwardly extending tabs 89 of the floating guide pin 86 engage and are slidably retained within corresponding lateral slots 91 in the shuttle 46. The tabs 89 and slots 91 are configured to allow the floating guide pin 86 to be easily installed on and retained by the shuttle 46 while allowing the floating guide pin 86 to move laterally relative to the shuttle 46.

A maze or labyrinth 90 extends integrally upward from an upper surface 74 of the tray base panel 44 and is configured to guide a lower distal end 92 of the floating guide pin 86 into engagement with forward and aft detents 94, 96 of the labyrinth 90. When the floating guide pin 86 is engaged in the aft detent 96 of the labyrinth 90 the pin 86 retains the shuttle 46 in the aft position. Likewise, when the floating guide pin 86 is engaged in the forward detent 94 the pin 86 retains the shuttle 46 in the forward position.

As best shown in FIG. 6, the shuttle 46 is biased aft by an L-shaped spring wire 98. The shuttle 46 is so biased to urge the floating guide pin 86 into engagement in the respective forward and aft detents 94, 96 and to provide sufficient force to bend the extensions 50, 51 and drive the crossbar 56 up the ramps 70, 72. The spring wire 98 is attached at one end to a pair of spring retainer posts 100, 101 that extend integrally upward from the tray support bracket 18. An opposite end of the shuttle spring 98 is attached to spring retainer notch 103 formed into the shuttle 46.

The labyrinth 90 includes walls 104 that form a circuitous path 106 configured to guide the floating guide pin 86 between the aft detent 98 and the forward detent 96 of the labyrinth 90. The circuitous path 106 includes a first portion 108 that leads from the aft detent 94 to a forward stop position 110 and a second portion 112 that leads from the forward stop position 110 to the forward detent 96. A third portion 114 of the circuitous path 106 leads from the forward detent 96 to an aft stop position 116. A fourth portion 118 completes the path 106 by leading from the aft stop position 116 to the aft detent 94.

In practice, when the cup tray 12 is in the stowed position and is pushed forward by a passenger compartment occupant, the tray 12 engages the push post 76 and moves the push post 76 and shuttle 46 forward. The forward movement of the shuttle 46 drives the floating guide pin 86 along the first portion 108 of the path 106 to the forward stop position 110 in the labyrinth 90. When the occupant stops pushing on the cup tray 12, the aft bias of the shuttle 46 will pull the pin 86 along the second portion 112 of the path 106 into engagement with the forward detent 96.

When a passenger compartment occupant pushes the cup tray 12 a second time, the floating guide pin 86 is driven forward along the third portion 114 of the path 106 to the aft stop position 114 in the labyrinth 90. When the occupant stops applying pressure to the cup tray 12, the aft bias of the shuttle 46 will pull the floating guide pin 86 aft along the fourth portion 118 of the path 106 into the aft detent 94.

In this way, repeated pushes against the cup tray 12 will alternately engage the floating guide pin 86 in the aft detent 98 and forward detent 96 of the labyrinth 90 which will alternate the shuttle 46 between the aft and the forward positions and consequently move the shuttle between its aft and forward positions. Each time the shuttle moves to its aft position the crossbar 56 rides up the ramps 70, 72, bending the flexible extensions 50, 51 upward and moving the teeth 40, 42 upward to their retracted position releasing the cup tray 12 to fall to its deployed position. Each time the shuttle 46 moves to its forward position the crossbar 56 rides back down the ramps 70, 72, moving the teeth 40, 42 downward into their engaged position holding the cup tray 12 in its stowed position.

This description is intended to illustrate certain embodiments of the invention rather than to limit the invention. Therefore descriptive rather than limiting words are used. Obviously, it's possible to modify this invention from what the description teaches and one may practice the invention other than as described.

What is claimed is:

1. A closure and release apparatus comprising:
    a latch receiver; and
    a latch including a shuttle supported for reciprocal motion between forward and aft positions on a latch base, the shuttle being biased toward its aft position, the latch base and shuttle being configured to alternately move a latch tooth of the shuttle between engaged and retracted positions relative to the latch receiver in response to successive actuations of the shuttle toward its forward position,
    the shuttle including a flexible extension that extends generally parallel to the direction of shuttle reciprocal motion and integrally connects a main body portion of the shuttle to the tooth, and a crossbar that extends integrally and transversely from the flexible extension adjacent the tooth;
    the cross bar being supported on a ramp that extends integrally from the latch base;
    the cross bar and ramp being oriented such that:
        shuttle movement toward the aft position causes the cross bar to ride up the ramp, bending the flexible extension upward and moving the tooth upward to the retracted position; and
        shuttle movement toward the forward position causes the cross bar to ride down the ramp, moving the tooth downward to the engaged position.

2. A closure and release apparatus comprising:
    a latch receiver; and
    a latch including a shuttle supported for reciprocal motion between forward and aft positions on a latch base, the shuttle being biased toward its aft position, the latch base and shuttle being configured to alternately move a latch tooth of the shuttle between engaged and retracted positions relative to the latch receiver in response to successive actuations of the shuttle toward its forward position, the shuttle including a push post that extends from a main body of the shuttle through a post slot in the latch base and into a position to be engaged by a member supporting the latch receiver such that inward pressure on the member causes the member to engage and move the push post forward which moves the shuttle toward the forward position.

3. A swing-down cup holder closure and release apparatus as defined in claim 2 in which the push post includes a pair of integrally laterally extending flanges that help retain the shuttle on the latch base panel while allowing the push post to slide longitudinally in the post slot.

4. A swing-down cup holder closure and release apparatus as defined in claim 2 in which:
    the shuttle includes a floating guide pin supported for transverse reciprocal sliding motion in a transverse slot in the main body portion of the shuttle;
    the base panel includes a labyrinth configured to guide a lower distal end of the floating guide pin into engagement with forward and aft detents of the labyrinth such that the floating guide pin retains the shuttle in the aft position when the floating guide pin is engaged in the aft detent and the floating guide pin retains the shuttle in the forward position when the floating guide pin is engaged in the forward detent; and
    the shuttle is biased aft to urge the pin into engagement in the respective detents.

5. A swing-down cup holder closure and release apparatus as defined in claim 4 in which the labyrinth is configured to cause the floating guide pin to follow a circuitous path between an aft and a forward detent such that:
    when the cup tray is in the stowed position and is pushed forward, engaging the push pin and moving the shuttle forward, the floating guide pin is driven around the path to a position in the labyrinth where release of the cup tray and the aft bias of the shuttle will pull the pin aft into the forward detent; and
    when the cup tray is pushed a second time, the floating guide pin is driven forward to a position in the labyrinth where subsequent release of the cup tray and the aft bias of the shuttle will pull the pin aft into the aft detent; and
    repeated pushes against the cup tray alternately engage the floating guide pin in the aft and forward detents of the labyrinth and alternate the shuttle between the aft and the forward positions.

6. A swing-down cup holder comprising:
    a cup tray supported on an automotive tray support structure for motion between a generally vertical stowed position and a generally horizontal deployed position;

a latch supported on one of the cup tray and the tray support structure of the swing-down cup-holder;

a latch receiver supported on the other of the cup tray and the tray support structure, the latch and latch receiver being supported in positions on the cup tray and tray support structure, respectively, such that the latch engages the latch receiver when the cup tray is moved to the stowed position, the latch being configured to disengage and release the cup tray from the stowed position in response to a predetermined amount of pressure applied inwardly to the cup tray; and a banana track supported on the support structure, the cup tray being supported on a banana track for simultaneous rotational and translational arcuate motion between the stowed and deployed positions to place the cup tray in a position closer to passengers when in the deployed position.

7. A swing-down cup holder as defined in claim 6 in which the cup tray is configured to automatically move out of the stowed position once the latch has disengaged.

8. A swing-down cup holder as defined in claim 6 in which the cup tray is pivotally supported on the support structure to pivot from the stowed to the deployed position.

9. A swing-down cup holder as defined in claim 8 in which:

the cup tray includes a recess formed in the outer edge wall of the cup tray;

the shuttle includes a latch tooth that is movable between an engaged position and a retracted position;

the tooth extends into the recess and retains the cup tray in the stowed position when the tooth is in the engaged position and the cup tray is in the stowed position; and the tooth is clear of the recess in the retracted position leaving the cup tray free to move out of the stowed position.

10. A swing-down cup holder as defined in claim 6 in which one of the latch and the latch receiver is supported on an outer edge wall of the cup tray.

11. A swing-down cup holder as defined in claim 10 in which the latch is supported on the tray support structure.

12. A swing-down cup holder as defined in claim 10 in which the cup tray is configured to automatically move to the deployed position once the latch has disengaged.

13. A swing-down cup holder as defined in claim 6 in which the cup tray is biased to move from the stowed position toward the deployed position.

14. A swing-down cup holder as defined in claim 13 in which a coil spring is operatively connected between the cup tray and the tray support structure and is configured and positioned to bias the cup tray to pivot from the stowed to the deployed position.

15. A swing-down cup holder comprising:

a cup tray supported on an automotive tray support structure for motion between a generally vertical stowed position and a generally horizontal deployed position and biased to move from the stowed position toward the deployed position;

a latch supported on one of the cup tray and the tray support structure of the swing-down cup-holder;

a latch receiver supported on the other of the cup tray and the tray support structure, the latch and latch receiver being supported in positions on the cup tray and tray support structure, respectively, such that the latch engages the latch receiver when the cup tray is moved to the stowed position, the latch being configured to disengage and release the cup tray from the stowed position in response to a predetermined amount of pressure applied inwardly to the cup tray; and a damper operatively connected between the cup tray and the tray support structure and configured to dampen biased movement of the cup tray toward the deployed position.

16. A closure and release apparatus for releasably locking a first structural element to a second structural element; the apparatus comprising:

a latch base configured to be supported on one of two structural elements, one of which is movably supported relative to the other;

a guide pin configured to be supported on the same one of the two structural elements that the latch base is supported on;

a labyrinth supported on the same one of the two structural elements that the latch base and guide pin are supported on, the labyrinth and guide pin being positioned such that the guide pin is disposed within the labyrinth when the two structural elements are disposed in a stowed position adjacent one another, the labyrinth being configured to direct the guide pin into engagement with a first labyrinth detent as the structural elements are moved to the stowed position, the structural elements being locked in the stowed position when the guide pin is engaged in the first labyrinth detent; and a latch shuttle supported on the latch base for movement between first and second positions relative to the base, the guide pin being supported on one of the base and the shuttle, the labyrinth being supported on the other of the base and the shuttle, the guide pin retaining the shuttle in the second position when engaged in a second labyrinth detent and retaining the shuttle in the first position when engaged in the first labyrinth detent, the shuttle being configured to hold the structural elements in the stowed position when the shuttle is in the first position by engaging a latch receiver disposed on whichever of the structural elements the latch base is not supported on.

17. A closure and release apparatus as defined in claim 16 in which the guide pin is supported on the shuttle for transverse reciprocal sliding motion in a transverse slot in the main body portion of the shuttle.

18. A closure and release apparatus as defined in claim 16 in which the shuttle is biased aft.

19. The closure and release apparatus of claim 16 in which:

the latch base is configured to be supported on the first structural element;

the labyrinth is supported on the latch base;

the guide pin is supported on the latch shuttle; and the latch receiver is disposed on the second structural element.

20. The closure and release apparatus of claim 19 in which:

the latch receiver comprises a recess formed into an outer surface of the second structural element;

the engagement element comprises a tooth positioned and configured to:

extend into the latch receiver recess when in the engaged position and when the second structural element is in the stowed position, and to remain clear of the recess in the retracted position leaving the second structural element free to move out of the stowed position; and the latch base panel and shuttle are configured to cooperatively move the tooth between the engaged and retracted positions in response to successive applications of a predetermined amount of pressure to the shuttle.

21. A closure and release apparatus as defined in claim 20 in which the shuttle includes a push post that extends from a main body of the shuttle through a post slot in the latch base and into a position to be engaged by the second structural element when the second structural element is in the stowed position such that inward pressure on the second structural element causes the second structural element to engage and move the push post forward which moves the shuttle toward the forward position.

22. The closure and release apparatus of claim 16 in which the shuttle includes an engagement element supported for motion between an engaged position engaging the latch receiver and a retracted position releasing the latch receiver.

23. The closure and release apparatus of claim 22 in which the engagement element is remote from the labyrinth.

24. A closure and release apparatus as defined in claim 23 in which:

the shuttle is supported on the base panel for reciprocal linear motion between a forward position and an aft position;

the shuttle includes a flexible extension that extends generally parallel to the direction of shuttle reciprocal motion and integrally connects a main body portion of the shuttle to the tooth;

the shuttle also includes a crossbar that extends integrally and transversely from the flexible extension adjacent the tooth;

the cross bar is slidably supported on a ramp supported on the latch base panel; the cross bar and ramp are oriented such that:

shuttle movement toward the aft position causes the cross bar to ride up the ramp, bending the flexible extension upward and moving the tooth upward to the retracted position; and shuttle movement toward the forward position causes the cross bar to ride down the ramp, moving the tooth downward to the engaged position.

25. A closure and release apparatus as defined in claim 24 in which the push post includes a pair of integrally laterally extending flanges that help retain the shuttle on the latch base panel while allowing the push post to slide longitudinally in the post slot.

* * * * *